(12) United States Patent
Watanabe et al.

(10) Patent No.: US 10,118,478 B2
(45) Date of Patent: Nov. 6, 2018

(54) AUTOMATIC TRANSMISSION

(71) Applicant: JATCO Ltd, Fuji-shi, Shizuoka (JP)

(72) Inventors: Kenichi Watanabe, Sagamihara (JP); Takeshi Morita, Kanagawa (JP)

(73) Assignee: JATCO Ltd, Fuji-shi (JP)

( * ) Notice: Subject to any disclaimer, the term of this patent is extended or adjusted under 35 U.S.C. 154(b) by 0 days.

(21) Appl. No.: 15/034,588

(22) PCT Filed: Oct. 28, 2014

(86) PCT No.: PCT/JP2014/078541
§ 371 (c)(1),
(2) Date: May 5, 2016

(87) PCT Pub. No.: WO2015/076068
PCT Pub. Date: May 28, 2015

(65) Prior Publication Data
US 2016/0272059 A1  Sep. 22, 2016

(30) Foreign Application Priority Data
Nov. 22, 2013  (JP) .................. 2013-242302

(51) Int. Cl.
*F16H 3/72*      (2006.01)
*B60K 6/543*     (2007.10)
(Continued)

(52) U.S. Cl.
CPC .............. *B60K 6/543* (2013.01); *B60K 6/365* (2013.01); *B60K 6/38* (2013.01); *B60K 6/387* (2013.01);
(Continued)

(58) Field of Classification Search
CPC .. F16H 2200/2023; F16H 3/725; F16H 3/663; F16H 3/72; B60K 6/365; B60K 6/543; B60Y 2400/72
See application file for complete search history.

(56) References Cited

U.S. PATENT DOCUMENTS 5,730,675 A * 3/1998 Yamaguchi ............ B60K 6/365
                                                            192/218
7,306,534 B2 * 12/2007 Bucknor ................ B60K 6/365
                                                            475/149
(Continued)

FOREIGN PATENT DOCUMENTS

DE  10 2011 087 995 A1  6/2013
JP       2003-146115 A    5/2003
(Continued)

*Primary Examiner* — Sherry L Estremsky
(74) *Attorney, Agent, or Firm* — Foley & Lardner, LLP

(57) ABSTRACT

An input shaft (1) connectable to an engine (5), an output gear (2), a transmission case (3) and a Ravigneaux planetary gear unit (4) are provided. Four rotational elements of the Ravigneaux planetary gear unit (4) are a single pinion side sun gear (Ss), a carrier (C), a ring gear (R) and a double pinion side sun gear (Sd) which are arranged orderly on a common speed diagram. The single pinion side sun gear (Ss) is constantly connected to a motor/generator (6), and the ring gear (R) is constantly connected to the output gear (2). And, with usage of a low & reverse clutch (L&R/C), a high clutch (H/C) and a low brake (L/B), a first speed (1st), a second speed (2nd), a third speed (3rd) and a stepless change speed (eCVT) are established.

4 Claims, 8 Drawing Sheets

(51) Int. Cl.
*B60K 6/365* (2007.10)
*F16H 61/66* (2006.01)
*F16H 63/50* (2006.01)
*F16H 3/62* (2006.01)
*B60K 6/38* (2007.10)
*F16H 3/66* (2006.01)
*B60K 6/387* (2007.10)
*B60K 6/48* (2007.10)

(52) U.S. Cl.
CPC ............... *B60K 6/48* (2013.01); *F16H 3/62* (2013.01); *F16H 3/663* (2013.01); *F16H 3/72* (2013.01); *F16H 3/725* (2013.01); *F16H 61/66* (2013.01); *F16H 63/50* (2013.01); *B60K 2006/381* (2013.01); *B60Y 2200/92* (2013.01); *B60Y 2400/72* (2013.01); *B60Y 2400/73* (2013.01); *F16H 2061/6602* (2013.01); *F16H 2200/0043* (2013.01); *F16H 2200/2023* (2013.01); *F16H 2200/2043* (2013.01); *F16H 2200/2064* (2013.01); *F16H 2200/2094* (2013.01); *Y02T 10/6221* (2013.01); *Y10S 903/91* (2013.01); *Y10S 903/912* (2013.01); *Y10S 903/918* (2013.01)

(56) References Cited

U.S. PATENT DOCUMENTS

| | | | |
|---|---|---|---|
| 7,329,201 B2* | 2/2008 | Raghavan | B60K 6/365 475/151 |
| 7,572,201 B2* | 8/2009 | Supina | B60K 6/365 180/65.22 |
| 7,931,555 B2* | 4/2011 | Iwanaka | B60K 6/365 475/282 |
| 9,644,715 B2* | 5/2017 | Lichtenegger | B60K 6/365 |
| 2006/0240929 A1 | 10/2006 | Raghavan et al. | |
| 2014/0349799 A1 | 11/2014 | Kaltenbach et al. | |

FOREIGN PATENT DOCUMENTS

| | | |
|---|---|---|
| JP | 2005-133907 A | 5/2005 |
| WO | WO-2013/034538 A1 | 3/2013 |

* cited by examiner

Fig. 2
|  | L&R/C | L/B | H/C | H/B | Rev/B | CL1 |
|---|---|---|---|---|---|---|
| e1st | ○ | ○ | | | | |
| 1st | ○ | ○ | | | | ○ |
| 2nd | | ○ | ○ | | | ○ |
| 3rd | ○ | | ○ | | | ○ |
| eCVT | | | ○ | | | ○ |
| 4th | | | ○ | ○ | | ○ |
| Rev | ○ | | | | ○ | ○ |
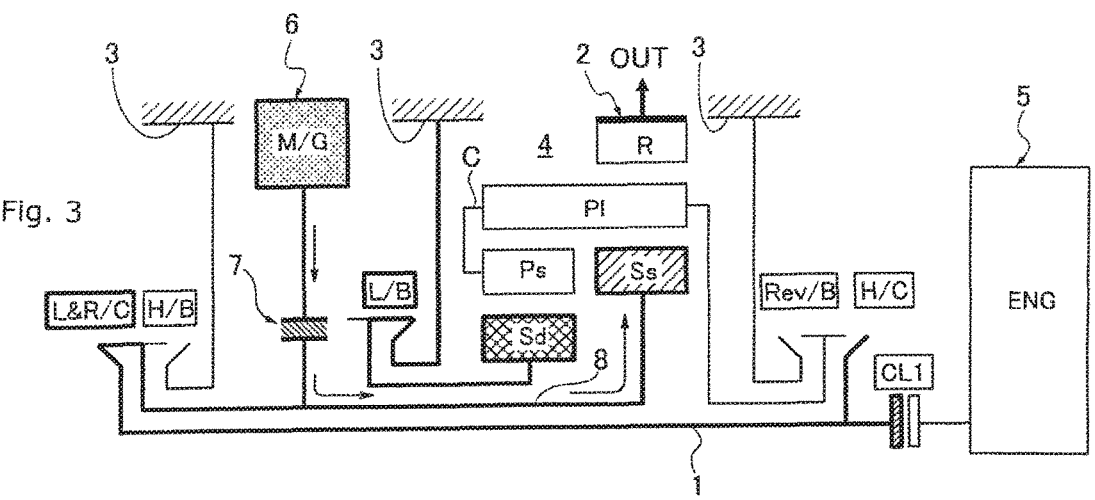
Fig. 3
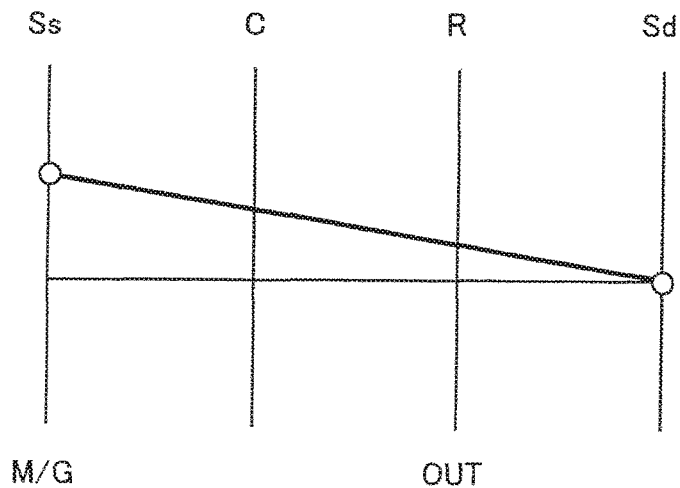
<e1st> *EV START MODE
Fig. 4

Fig. 12   <eCVT> *STEPLESS SPEED CHANGE MODE
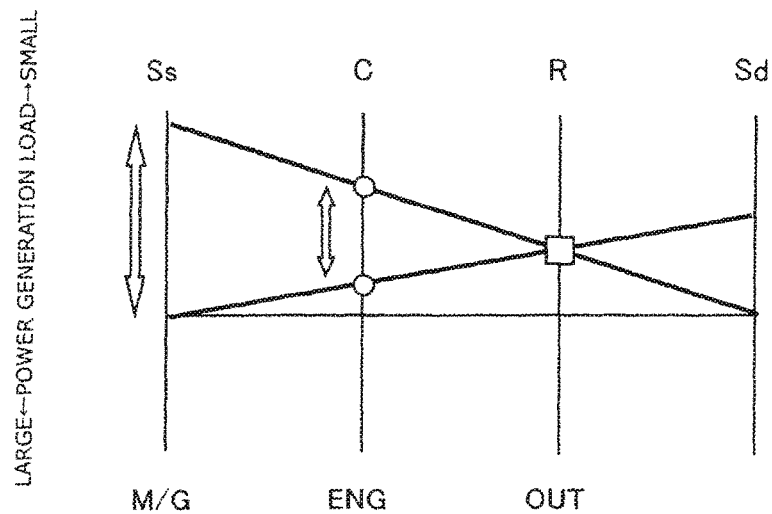
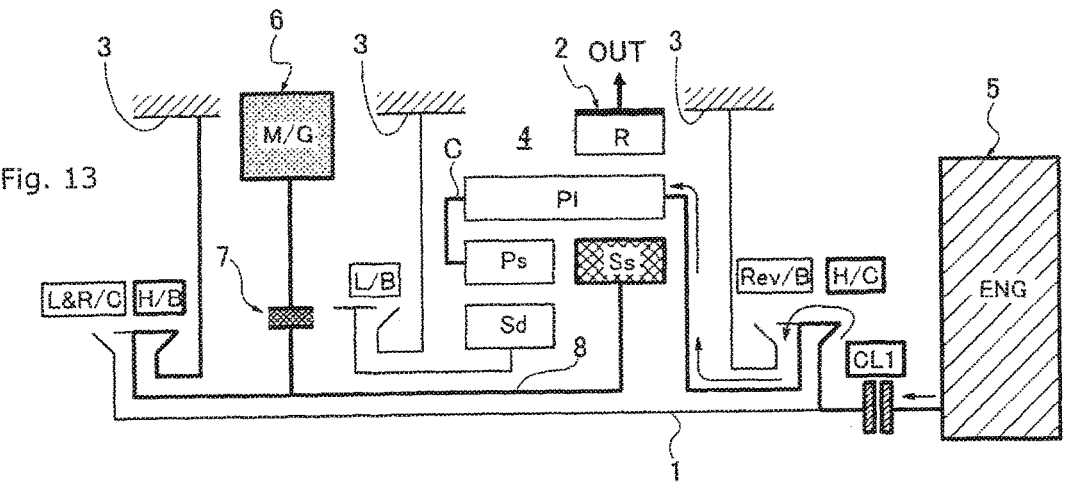
Fig. 13

AUTOMATIC TRANSMISSION

TECHNICAL FIELD

The present invention relates to an automatic transmission that is applied to hybrid vehicles and comprises a planetary gear unit connected to both an engine and a motor/generator.

BACKGROUND ART

Hitherto, there are known hybrid vehicles of a type that comprises an assist motor mechanically connected to an engine and a stepped transmission connected to the assist motor (see for example Patent Document-1).

PRIOR ART DOCUMENTS

Patent Documents

Patent Document-1: Japanese Laid-open Patent Application (tokkai) 2003-146115

SUMMARY OF INVENTION

Problems to be Solved by Invention

In the hitherto used conventional hybrid vehicles, the engine, the assist motor and the stepped transmission are arranged in this order and mechanically connected to one another from an upstream side. Accordingly, although the engine load can be controlled by changing an assist torque generated by the assist motor, a rotation speed of the engine can't be controlled and thus the engine operation point fails to have a satisfied degree of freedom.

The present invention is provided by taking the above-mentioned drawback into consideration and aims to provide an automatic transmission that is constructed to increase a degree of freedom of the engine operation point by controlling both the load and rotation speed of the engine by the motor/generator.

Means for Solving Problems

In order to achieve the object, the present invention provides an automatic transmission which comprises an input member connectable to an engine, an output member, a fixed portion and a planetary gear unit including four rotational elements.

In the automatic transmission, the four rotational elements of the planetary gear unit are first, second, third and fourth elements which are arranged orderly on a common speed diagram.

The first element is constantly connected to the motor/generator and connectable to the input member due to engagement of the first clutch.

The second element is connectable to the input member due to engagement of the second clutch.

the third element is constantly connected to the output member;

The fourth element is fixable to the fixed portion due to engagement of the first brake.

A first speed is established due to engagement of both the first clutch and the first brake.

A second speed whose speed change ratio is smaller than that of the first speed is established due to engagement of both the first brake and the second clutch.

A third speed whose speed change ratio is smaller than that of the second speed is established due to engagement of both the first clutch and the second clutch.

A stepless speed change that enables the speed change ratio to vary steplessly is established by engaging the second clutch and varying a rotation speed of the motor/generator.

Effects of Invention

Accordingly, in addition to the stepped speed changes including the first, second and third speeds, the stepless change speed is obtained.

In case of selecting the stepless change speed, the second element of the planetary gear unit is connected to the engine due to engagement of the second clutch. Accordingly, when the power generation amount of the motor/generator constantly connected to the first element of the Ravigneaux planetary gear unit is controlled, the motor/generator becomes a variable load applied to the first element of the planetary gear unit, and a speed of rotation (=input rotation speed) of the engine connected to the second element is steplessly varied in accordance with a degree of a load restriction. That is, a speed change ratio that is a ratio between input and output speeds can be steplessly varied. In addition to this, by varying a power generation amount (regenerative torque) of the motor/generator, an engine rotation speed and an engine load (=power generation load) can be controlled by the motor/generator.

As a result, by controlling the engine load and the rotation speed by the motor/generator, the freedom of the engine operation point can increased.

BRIEF DESCRIPTION OF DRAWINGS

FIG. 2 is an engagement operation table showing a stepped speed change including four speeds forward with one reverse and a stepless speed change, which are established by selectively combining a synchronized engagement of five engaging elements with a frictional engagement of one friction element.

FIG. 3 is a skeleton view depicting a torque flow in case of first speed in EV start mode (e1st).

FIG. 4 is a common speed diagram showing a relation in speed of four rotational elements in case of first speed in EV start mode (e1st).

FIG. 12 is a common speed diagram showing a relation in speed of the four rotational elements in case of the stepless speed in the stepless speed change mode (eCVT).

FIG. 13 is a skeleton view depicting a torque flow in case of fourth speed (4th).

EMBODIMENT FOR CARRYING OUT INVENTION

Figure 1:
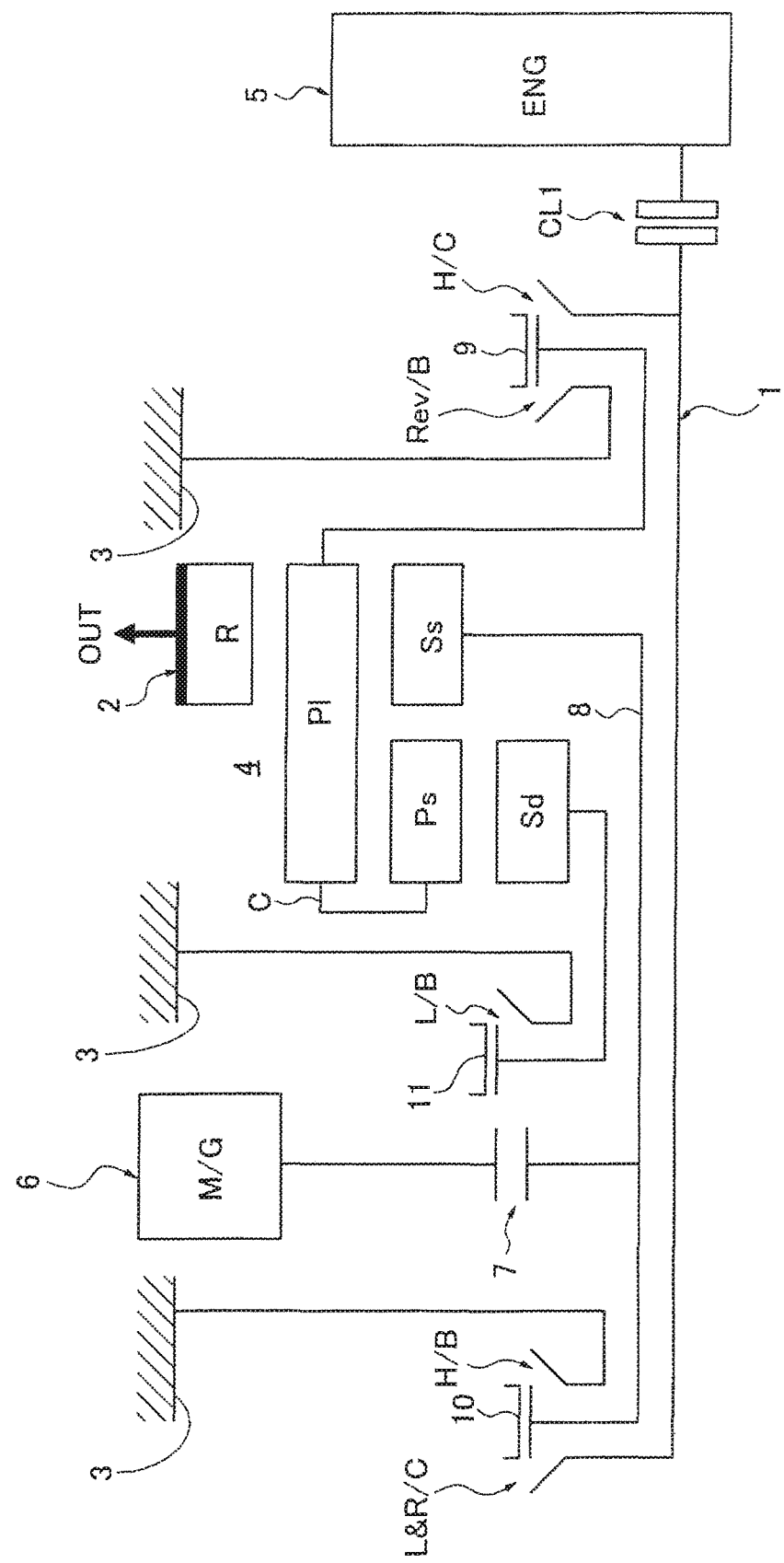
FIG. 1 is a skeleton view of an automatic transmission of a first embodiment.

In the following, the best mode embodying an automatic transmission of the present invention will be described based on a first embodiment shown in the drawings.

First Embodiment

First, description will be directed to the construction.

The construction of the automatic transmission of the first embodiment mounted on a hybrid vehicle will be described in separated paragraphs that explain "entire construction" and "engaging operation of each speed" respectively.

[Entire Construction]

FIG. 1 is a skeleton view of an automatic transmission of a first embodiment. In the following, the entire construction of the automatic transmission of the first embodiment will be described with reference to FIG. 1.

As is seen from FIG. 1, the automatic transmission of the first embodiment comprises an input shaft 1 (viz., input member), an output gear 2 (viz., output member), a transmission case 3 (viz., stationary portion) and a Ravigneaux planetary gear unit 4 (viz., a planetary gear unit having four rotational elements). As engaging/disengaging elements, there are employed an input clutch CL1, a low & reverse clutch L&R/C (viz., first clutch), a high clutch H/C (viz., second clutch), a low brake L/B (viz., first brake), a high brake H/B (viz., second brake) and a reverse brake Rev/B (viz., third brake).

The input shaft 1 is connectable to an engine 5 through the input clutch CL1. The input clutch CL1 used is a friction clutch that establishes a friction engagement upon pressing a friction surface against a partner member while the other engaging/disengaging elements are of a dog-clutch type that establishes a gear engagement between two members upon synchronized rotation of the two members (hereinafter referred to as "synchronized engagement").

The output gear 2 is meshed with a ring gear R of the Ravigneaux planetary gear unit 4 to output its rotation drive force (torque) to drive wheels (not shown).

The transmission case 3 is a case for housing therein the Ravigneaux planetary gear unit 4 as well as the engaging/disengaging elements and served as a stationary fixed portion when the low brake L/B, the high brake H/B and the reverse brake Rev/B are in a synchronized engagement.

The Ravigneaux planetary gear unit 4 is a planetary gear unit with four rotational elements and comprises a single pinion side sun gear Ss (first sun gear), a double pinion side sun gear Sd (second sun gear), a short pinion gear Ps (first pinion gear), a long pinion gear Pl (second pinion gear), a ring gear R and a carrier C. The single pinion side sun gear Ss and the ring gear R are meshed with the long pinion gear Pl. The double pinion side sun gear Sd is meshed with the short pinion gear Ps. The short pinion gear Ps and the long pinion gear Pl are meshed with each other and rotatably supported by the same carrier C.

The four rotational elements of the Ravigneaux planetary gear unit 4 are the single pinion side sun gear Ss (first element), the carrier C (second element), the ring gear R (third element) and the double pinion side sun gear Sd (fourth element) in the order in which the four rotational elements are arranged on the common speed diagram. In the following, mutual connection among the first element (single pinion side sun gear Ss), the second element (carrier C), the third element (ring gear R) and the fourth element (double pinion side sun gear Sd) will be explained with reference to FIG. 1.

The single pinion side sun gear Ss is constantly connected to the motor/generator through a connection gear 7. Upon synchronized engagement of the low & reverse clutch L&R/C, the gear Ss is connected to the input shaft 1. Upon synchronized engagement of the high brake H/B, the gear Ss is connected or fixed to the transmission case 3.

Upon synchronized engagement of the high clutch H/C, the carrier C is connected to the input shaft 1. Upon synchronized engagement of the reverse brake Rev/B, the carrier C is connected or fixed to the transmission case 3.

The ring gear R is constantly meshed with the output gear 2.

Upon synchronized engagement of the low brake L/B, the double pinion side sun gear Sd is connected or fixed to the transmission case 3.

In the following, the layout of the automatic transmission of the first embodiment will be explained with reference to FIG. 1.

The input shaft 1 is coaxially arranged in the Ravigneaux planetary gear unit 4.

The high clutch H/C and the reverse brake Rev/B are arranged at one axial end side (engine 5 side) of the Ravigneaux planetary gear unit 4. More specifically, the units H/C and Rev/B are arranged between the Ravigneaux planetary gear unit 4 and the input clutch CL1.

The low brake L/B is arranged at the other axial end side of the Ravigneaux planetary gear unit 4.

The low & reverse clutch L&R/C and the high brake H/B are arranged at an axially opposed side of the Ravigneaux planetary gear unit 4 and more far from the Ravigneaux planetary gear unit 4 than the low brake L/B.

A motor/generator 6 is arranged at a position between the low brake L/B and the high brake H/B. The motor/generator 6 is constantly connected to the single pinion side sun gear Ss through a connecting member 8 that extends in a space defined between an inner cylindrical side of the single pinion side sun gear Ss and an outer cylindrical side of the input shaft 1.

The high clutch H/C and the reverse brake Rev/B are constructed as a pair of dog-clutches that are able to selectively establish a synchronized engagement of the high clutch and that of the reverse brake Rev/B. That is, when a common coupling sleeve 9 is shifted rightward in FIG. 1 from a neutral position, the synchronized engagement of the high clutch H/C is established. And, when the common coupling sleeve 9 is shifted leftward in FIG. 1 from the neutral position, the synchronized engagement of the reverse brake Rev/B is established.

The low & reverse clutch L&R/C and the high brake H/B are constructed as a pair of dog-clutches that are able to selectively establish a synchronized engagement of the low & reverse clutch L&R/C and that of the high brake H/B. That is, when a common coupling sleeve 10 is shifted leftward in FIG. 1 from a neutral position, the synchronized engagement of the low & reverse clutch L&R/C is established. And, when the common coupling sleeve 10 is shifted rightward in FIG. 1 from the neutral position, the synchronized engagement of the high brake H/B is established. It is to be noted that the low brake L/B is constructed as a signal dog-clutch that establishes a synchronized engagement of the low brake L/B when a coupling sleeve 11 is shifted rightward in FIG. 1 from a neutral position.

[Engaging Operation of Each Speed]

FIG. 2 is an engagement operation table prepared for the automatic transmission of the first embodiment, which shows a stepped speed change including four speeds forward with one reverse and a stepless change, which are established by selectively combining a synchronized engagement of five engaging elements with a frictional engagement of one friction element. In the following, the engagement operation in each speed will be described based on FIG. 2.

It is to be noted that the automatic transmission of the first embodiment is switchable to an EV start mode and a stepless speed change mode, and has, as speeds, a first speed in EV start mode (e1st), a first speed (1st), a second speed (2nd), a third speed (3rd), a stepless speed in stepless change speed mode (eCVT), a fourth speed (4th) and a reverse (Rev).

The first speed in EV start mode (e1st) is obtained by establishing the synchronized engagement of the low brake L/B. It is to be noted that the "EV start mode" is a mode in which the vehicle is moved by only the drive force of the motor/generator 6 with the low brake L/B being kept in the synchronized engagement. In the first speed in EV start mode (e1st), to provide for shifting to the first speed, the low & reverse clutch L&R/C is in the synchronized engagement previously.

The first speed (1st) is obtained by establishing the synchronized engagement of both the low & reverse clutch L&R/C and low brake L/B and establishing the frictional engagement of the input clutch CL1. That is, the first speed (1st) is obtained by a combination of the drive force of the engine 5 and that of the motor/generator 6, and thus, the speed (1st) is different from the above-mentioned first speed in EV start mode (e1st).

The second speed (2nd) is obtained by establishing the synchronized engagement of both the low brake L/B and high clutch H/C and establishing the frictional engagement of the input clutch CL1. The speed change ratio at this second speed (2nd) in which the engine rotation speed is used as an input rotation speed of the Ravigneaux planetary gear unit 4 is smaller than the speed change ratio at the first speed (1st).

The third speed (3rd) is obtained by establishing the synchronized engagement of both the low & reverse clutch L&R/C and high clutch H/C. When driving by engine is needed, the input clutch CL1 is brought into the frictional engagement. The speed change ratio at this third speed (3rd) in which the engine rotation speed is used as an input rotation speed of the Ravigneaux planetary gear unit 4 is 1 (one) and thus smaller than the speed change ratio at the second speed (2nd).

The stepless speed in the stepless speed change mode (eCVT) is obtained by establishing synchronized engagement of the high clutch H/C and establishing frictional engagement of the input clutch CL1. The stepless speed change mode is a mode in which the speed change ratio can be steplessly or continuously varied while controlling a power generation amount of the motor/generator 6 and the vehicle can be moved by the drive force of the engine 5 while charging a battery (not shown). That is, when the motor/generator 6 is subjected to the control for the power generation amount, the single pinion side sun gear Ss of the Ravigneaux planetary gear unit 4 connected to the motor/generator 6 is applied with a variable load. With this applied variable load, a load applied to the engine 5 is varied, so that a stepless change speed (eCVT) is obtained in which the speed change ratio is steplessly varied using the engine rotation speed as the input rotation speed.

The fourth speed (4th) is obtained by establishing the synchronized engagement of both the high clutch H/C and high brake H/B and establishing the frictional engagement of the input clutch CL1. The speed change ratio at the fourth speed (4th) in which the engine rotation speed is used as the input rotation speed of the Ravigneaux planetary gear unit 4 is smaller than the speed change ratio at the third speed (3rd) (Overdrive speed).

The above-mentioned reverse stage (Rev) is obtained by establishing the synchronized engagement of both the low & reverse clutch L&R/C and reverse brake Rev/B. When driving by engine is needed, the input clutch CL1 is put into the frictional engagement. In the reverse stage (Rev), the rotation speed of the motor or that of the engine is used as the input rotation speed of the Ravigneaux planetary gear unit 4 and the rotation direction of the output gear 2 is reversed relative to the above-mentioned speeds forward.

In the following, operation will be described.

Operation of the automatic transmission of the first embodiment will be described in separated paragraphs that explain "speed change operation in each speed" and "operation corresponding to each Claim" respectively.

[Speed Change Operation in Each Speed]

(First Speed in EV Start Mode)

A speed change operation for the first speed in EV start mode (e1st) will be explained with reference to FIGS. 3 and 4. In the first speed in EV start mode (e1st), due to engagement of the low brake L/B, the double pinion side sun gear Sd of the Ravigneaux planetary gear unit 4 is fixed to the transmission case 3. Under this condition, the rotating force (or torque) from the motor/generator 6 is inputted into the single pinion side sun gear Ss through the connecting gear 7 and the connecting member 8 (see arrows in FIG. 3).

Due to inputting the speed of rotation to the single pinion side sun gear Ss from the motor and fixing of the double pinion side sun gear Sd to the case, a common speed diagram as shown in FIG. 4 is obtained. That is, from the ring gear R of the Ravigneaux planetary gear unit 4, there is obtained a speed change ratio of the first speed (e1st) which is produced by reducing the speed of the rotation led to the single pinion side sun gear Ss from the motor.

Accordingly, at the time for starting the vehicle, by setting the mode to the EV start mode in which with the low brake L/B being engaged, the vehicle is moved by only the power of the motor/generator 6, which brings about a high response starting of the vehicle while keeping a silence.

While, in case of shifting the state from the first speed in EV start mode (e1st) to the stepless change speed (eCVT), the input clutch CL1 is engaged after starting the engine in addition to a so-called clutch switching control effected between disengagement of the low brake L/B and engagement of the high clutch H/C. With these actions, the state can be shifted from the first speed (e1st) to the stepless change speed (eCVT).

(First Speed)

Figure 5:
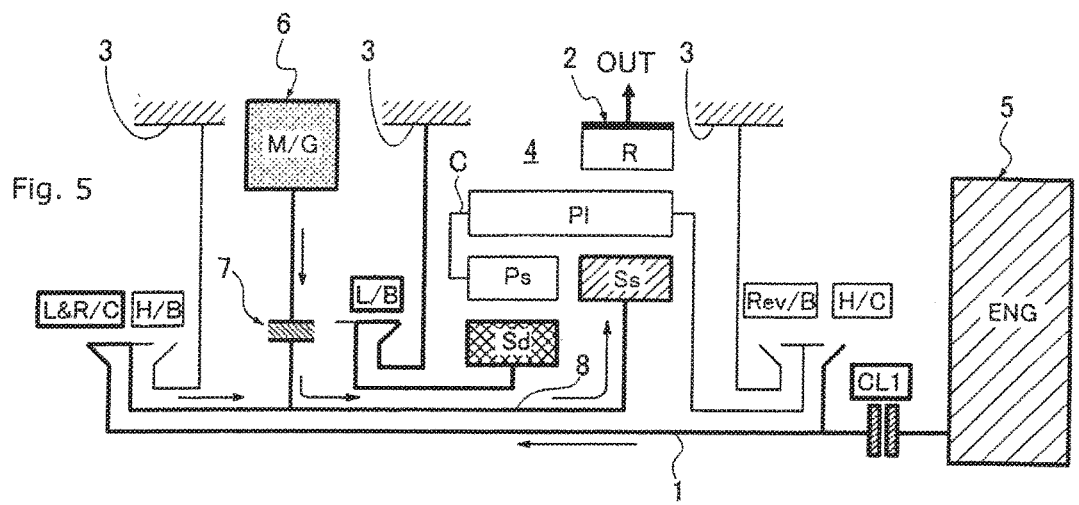
FIG. 5 is a skeleton view depicting a torque flow in case of first speed (1st).

A speed change operation for the first speed (1st) will be explained with reference to FIGS. 5 and 6.

In the first speed (1st), by establishing the engagement of the low brake L/B, the double pinion side sun gear Sd of the Ravigneaux planetary gear unit 4 is fixed to the transmission case 3, and by establishing the engagement of both the low & reverse clutch L&R/C and input clutch CL1, the engine 5 is connected to the single pinion side sun gear Ss of the Ravigneaux planetary gear unit 4. Under this condition, the rotation drive force (torque) from the engine 5 is inputted to the single pinion side sun gear Ss through the input clutch CL1, the input shaft 1, the low & reverse clutch L&R/C and the connecting member 8. When an assist running mode is selected, the drive force of the motor/generator 6 controlled in torque is inputted to the single pinion side sun gear Ss through the connecting gear 7 and the connecting member 8 (see arrows in FIG. 5).

Figure 6:
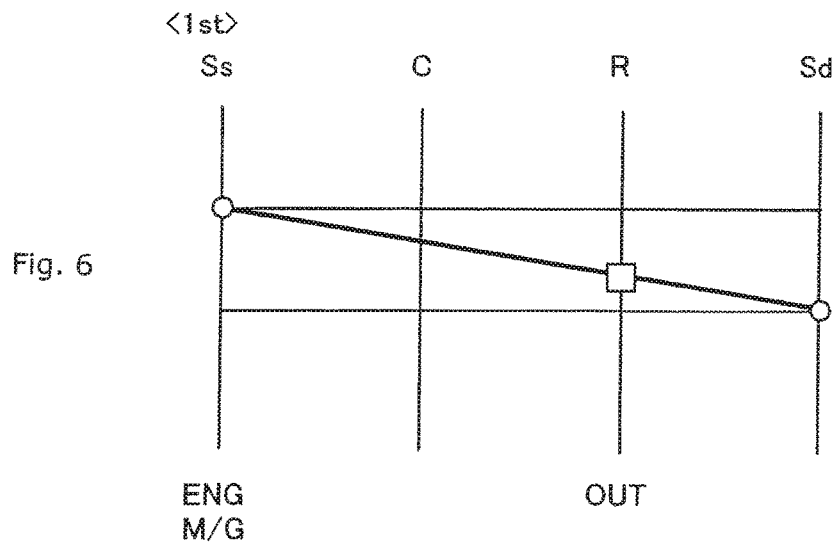
FIG. 6 is a common speed diagram showing a relation in speed of the four rotational elements in case of first speed (1st).

Due to inputting of rotation speed of the engine (=rotation speed of the motor) to the single pinion side sun gear Ss and fixing of the double pinion side sun gear Sd to the case, a common speed diagram as shown in FIG. 6 is obtained. That is, from the ring gear R of the Ravigneaux planetary gear unit 4, there is obtained a speed change ratio of the first speed (1st) which is produced by reducing the speed of the rotation from the engine (=the speed of rotation from the motor) that is led to the single pinion side sun gear Ss.

Accordingly, at the time for shifting the first speed in EV start mode (e1st) to the first speed (1st), the low & reverse clutch L&R/C is previously engaged in the first speed in EV start mode (e1st). Thus, only by engaging the input clutch CL1 after starting the engine 5, the shifting from the first speed (e1st) provided by only the drive force of the motor to the first speed (1st) provided by adding the drive force of the engine to the drive force of the motor can be smoothly carried out with a high response.

In case of making a down-shifting from the second speed (2nd) to the first speed (1st) during cruising, a clutch switching control effected between engagement of the low & reverse clutch L&R/C and disengagement of the high clutch H/C makes the shifting to the first speed (1st) possible. Furthermore, by controlling the torque of the motor in addition to carrying out the clutch switching control, a smoothed speed change can be carried out generating no torque shortage in spite of using the dog-clutch type engaging/disengaging elements.

Furthermore, when the vehicle is running keeping the first speed (1st), either one of the assist running mode (motor powering: FIG. 5), an engine drive mode (no motor load) and an engine generation drive mode (regeneration by generator) can be selected for continuous cruising. That is, by making a selection in the modes, the engine load can be controlled.

(Second Speed)

Figure 7:
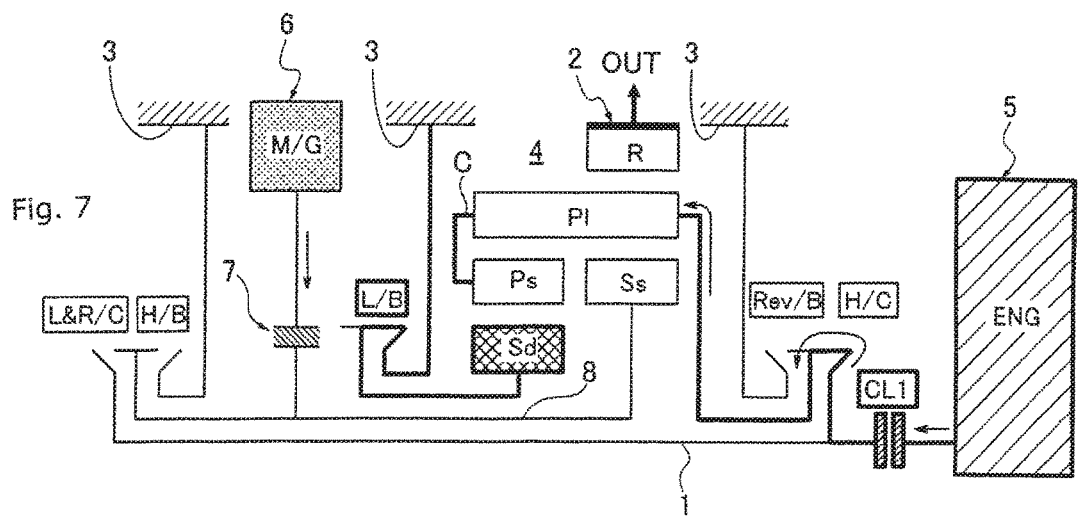
FIG. 7 is a skeleton view depicting a torque flow in case of second speed (2nd).

A speed change operation for the second speed (2nd) will be explained with reference to FIGS. 7 and 8.

In the second speed (2nd), by establishing the engagement of the low brake L/B, the double pinion side sun gear Sd of the Ravigneaux planetary gear unit 4 is fixed to the transmission case 3, and by establishing the engagement of both the high clutch H/C and input clutch CL1, the engine 5 is connected to the carrier C of the Ravigneaux planetary gear unit 4. Thus, the rotation drive force (torque) from the engine 5 is inputted to the carrier C through the input clutch CL1 and high clutch H/C (see arrows in FIG. 7).

Figure 8:
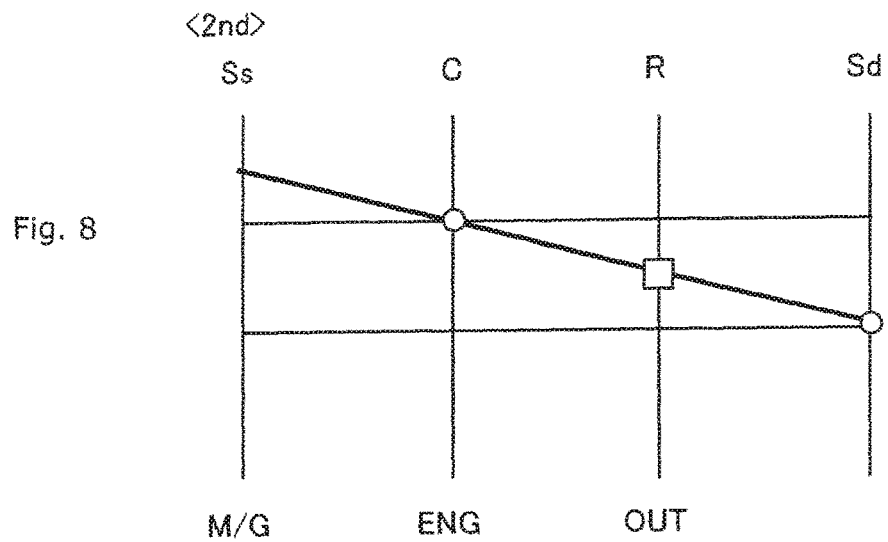
FIG. 8 is a common speed diagram showing a relation in speed of the four rotational elements in case of second speed (2nd).

Due to inputting of rotation speed of the engine and fixing of the double pinion side sun gear Ss to the case, a common speed diagram as shown in FIG. 8 is obtained. Thus, from the ring gear R of the Ravigneaux planetary gear unit 4, there is obtained a speed change ratio of the second gear (2nd) which is produced by reducing the speed of the rotation from the engine that is led to the carrier C. The speed change ratio of the second speed (2nd) is a ratio (high speed change ratio side) that is smaller than that of the first speed (1st).

Accordingly, at the time for making an up-shifting from the first speed (1st) to the second speed (2nd) during cruising, a clutch switching control effected between disengagement of the low & reverse clutch L&R/C and engagement of the high clutch H/C makes the shifting to the second speed (2nd) possible. Furthermore, by controlling the torque of the motor in addition to effecting the clutch swinging control, a smoothed speed change can be carried out generating no torque shortage in spite of using the dog-clutch type engaging/disengaging elements.

Furthermore, at the time for making a down-shifting from the third speed (3rd) to the second speed (2nd) during cruising, a clutch switching control effected between disengagement of the low & reverse clutch L&R/C and engagement of the low brake L/B makes the shifting to the second speed (2nd) possible. Furthermore, by controlling the torque of the motor in addition to carrying out the clutch switching control, a smoothed speed change can be carried out generating no torque shortage in spite of using the dog-clutch type engaging/disengaging elements are used.

Furthermore, when the vehicle is running keeping the second speed (2nd), either one of the assist running mode (power powering), the engine drive mode (no motor load: FIG. 7) and the engine generation drive mode (regeneration by generator) can be selected for continuing the cruising. That is, by making a selection in the modes, the load that is received by the engine from the motor/generator 6 can be controlled. As is understood from FIG. 8, in the second speed (2nd), the speed of rotation of the motor/generator 6 connected to the single pinion side sun gear Ss is higher than that of rotation led from the engine to the carrier C.

(Third Speed)

Figure 9:
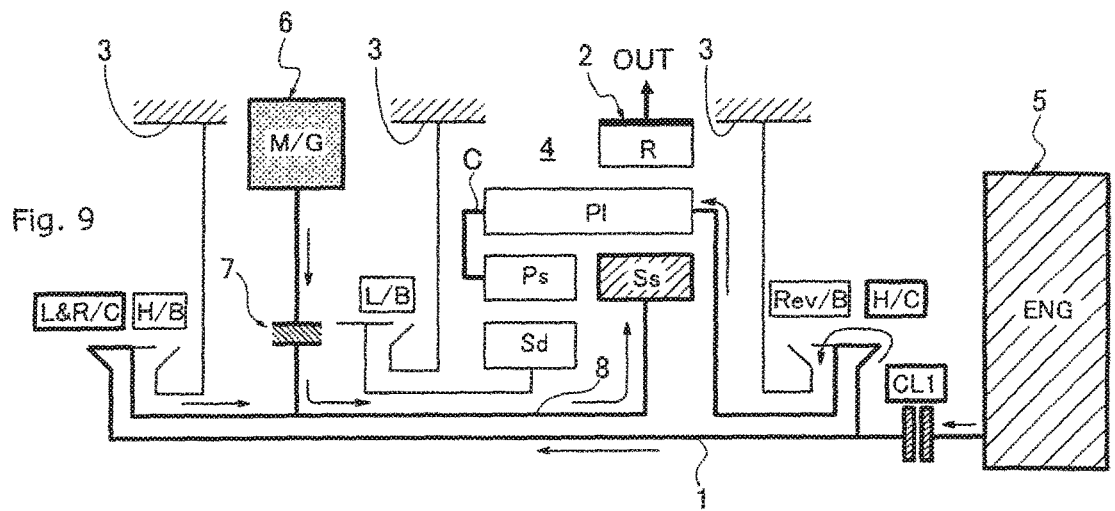
FIG. 9 is a skeleton view depicting a torque flow in case of third speed (3rd).

A speed change operation for the third speed (3rd) will be explained with reference to FIGS. 9 and 10.

In the third speed (3rd), by establishing the engagement of both the low & reverse clutch L&R/C and high clutch H/C, the single pinion side sun gear Ss of the Ravigneaux planetary gear unit 4 is connected to the carrier C. That is, a condition is established wherein the four rotational elements of the Ravigneaux planetary gear unit 4 are integrally rotated. Accordingly, upon section of the EV mode, the rotation drive force (torque) from the motor/generator 6 is inputted to the single pinion side sun gear Ss and the carrier C. When, in the HEV mode, the input clutch CL1 is engaged after starting the engine 5, the rotation drive force (torque) from the engine 5 and that from the motor/generator 6 are inputted to the single pinion side sun gear Ss and the carrier C (see FIG. 9).

Figure 10:
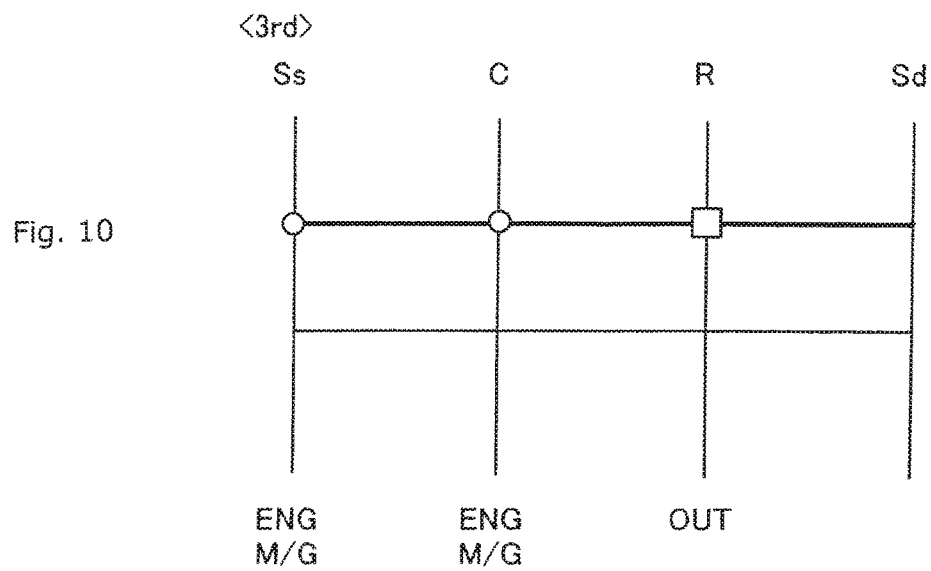
FIG. 10 is a common speed diagram showing a relation in speed of the four rotational elements in case of third speed (3rd).

Due to the connection between the single pinion side sun gear Ss and the carrier C, a common speed diagram as shown in FIG. 10 is obtained in which all of the four rotational elements show the same rotation speed. Accordingly, from the ring gear R of the Ravigneaux planetary gear unit 4, there is produced the third speed whose speed change ratio is 1 (one) meaning that the speed of rotation of the ring gear R is the same as that of rotation led to the single pinion side sun gear Ss and to the carrier C.

Accordingly, at the time for making an up-shifting from the second speed (2nd) to the third speed (3rd) during cruising, a clutch switching control effected between engagement of the low & reverse clutch L&R/C and disengagement of the low brake L/B makes the shifting to the third speed (3rd) possible. Furthermore, by controlling the torque of the motor in addition to effecting the clutch switching control, a smoothed speed change be carried out generating no torque shortage in spite of using the dog-clutch type engaging/disengaging elements.

Furthermore, at the time for making a down-shifting from the fourth speed (4th) to the third speed (3rd) during cruising, a clutch switching control effected between engagement of the low & reverse clutch L&R/C and disengagement of the high brake H/B makes the shifting to the third speed (3rd) possible. Furthermore, by controlling the torque of the motor in addition to effecting the clutch switching control, a smoothed speed change can be carried out generating no torque shortage in spite of using the dog-clutch type engaging/disengaging elements.

By controlling the disengagement/engagement of the input clutch CL1, there are selectively obtained "EV mode third speed" in which only the motor/generator 6 severs as a drive source and "HEV mode third speed (FIG. 9)" in which both the engine 5 and motor/generator 6 serve as the drive source. Thus, the EV running is possible in two speeds that are the first speed (1st) and the third speed (3rd), and thus, the vehicle can make the EV running using a speed change ratio suitable for the vehicle starting and the high speed cruising, which brings about an economical EV cruising.

When the vehicle is running in the HEV mode keeping the third speed (3rd), either one of the assist running mode (motor powering), the engine drive mode (no motor load) and the engine generation drive mode (regeneration by generator) can be selected for continuous cruising. That is, by making a selection in the modes, the engine load can be controlled.

(Stepless Speed Change in Stepless Speed Change Mode)

Figure 11:
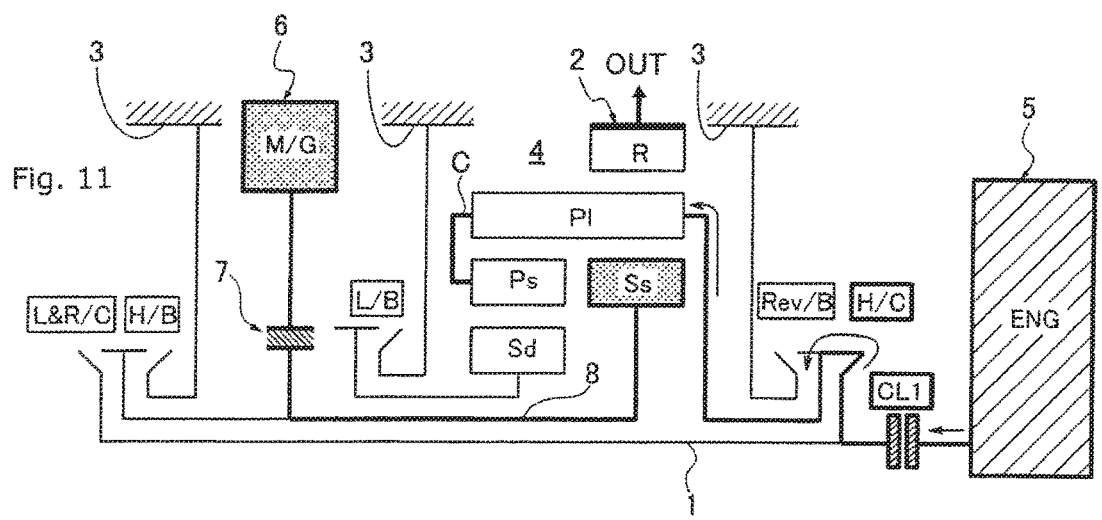
FIG. 11 is a skeleton view depicting a torque flow in case of a stepless speed in a stepless speed change mode (eCVT).

A speed change operation for the stepless speed change in the stepless speed change mode (eCVT) will be explained with reference to FIGS. 11 and 12.

In the stepless speed change in the stepless speed change mode (eCVT), by establishing the engagement of both the high clutch H/C and the input clutch CL1, the engine 5 is connected to the carrier C of the Ravigneaux planetary gear unit 4. Under this condition, the rotation drive force (torque) from the engine 5 is inputted to the carrier C through the input clutch CL1 and the high clutch H/C (see arrows in FIG. 1). When the motor/generator 6 is subjected to the control for the power generation amount, a variable load (the degree of load restriction becomes higher as the power generation amount is increased) is applied to the single pinion side sun gear Ss of the Ravigneaux planetary gear unit 4 to which the motor/generator 6 is connected.

Due to inputting of rotation speed of the engine to the carrier C and the variable load to the single pinion side sun gear Ss, a common speed diagram as shown in FIG. 12 is obtained. That is, from the ring gear R of the Ravigneaux planetary gear unit 4, there is obtained a stepless speed change ratio that is changeable in a range from a speed change ratio provided by reducing the speed of rotation led from the engine to the carrier C to a speed change ration provided by increasing the speed of rotation led from the engine to the carrier C. For example, in case where the output rotation speed (vehicle speed) is constant, the rotation speed of the motor/generator 6 is reduced as the power generation load is increased, so that there is obtained a speed change ratio for a speed increased side. While, in case where the output rotation speed (vehicle speed) is constant, the rotation speed of the motor/generator 6 is increased as the power generation load is reduced, so that there is obtained a speed change ratio for a speed reduced side. That is, in the stepless speed change in the stepless speed change mode (eCVT), the steplessly variable speed change is obtained by controlling the power generation amount of the motor/generator 6.

Accordingly, when a stepless speed change in the stepless speed change mode (eCVT) is selected, the speed change ratio can be steplessly varied by controlling the power generation amount of the motor/generator 6, and at the same time, the vehicle can be moved by the drive force of the engine 5 while charging a battery (not shown).

When, under cruising at the second speed (2nd), it is intended to shift the speed to the stepless change speed (eCVT), the low brake L/B is disengaged. When, under cruising at the third speed (3rd), it is intended to shift the speed to the stepless change speed (eCVT), the low & reverse clutch L&R/C is disengaged. While, when, under cruising at the fourth speed (4th), it is intended to shift the speed to the stepless change speed (eCVT), the high brake H/B is disengaged. That is, when, under cruising at either one of the second, third and fourth speeds (2nd, 3rd and 4th), it is intended to shift the speed to the stepless change speed (eCVT), only one of the engaging elements is disengaged, and thus, the shifting to the stepless change speed (eCVT) can be smoothly made with a high response. Furthermore, when, under cruising at the stepless change speed (eCVT), it is intended to shift the speed to either one of the second, third and fourth speeds (2nd, 3rd and 4th), the shifting to the second speed (2nd), third speed (3rd) or fourth speed (4th) is achieved by engaging selected one of the engaging elements while synchronizing rotation thereof. Thus, the shifting to the second speed (2nd), third speed (3rd) or fourth speed (4th) is smoothly made with a high response.

(Fourth Speed)

A speed change operation for the fourth speed (4th) will be explained with reference to FIGS. 13 and 14.

In the fourth speed (4th), by engaging the high brake H/B, the single pinion side sun gear Ss of the Ravigneaux planetary gear unit 4 and the motor/generator 6 are fixed to the transmission case 3. And, by engaging the high clutch H/C and the input clutch CL1 respectively, the engine 5 is connected to the carrier C of the Ravigneaux planetary gear unit 4. Under this condition, the rotation drive force from the engine 5 is inputted to the carrier C through the input clutch CL1 and the high clutch H/C (see arrows in FIG. 13).

Figure 14:
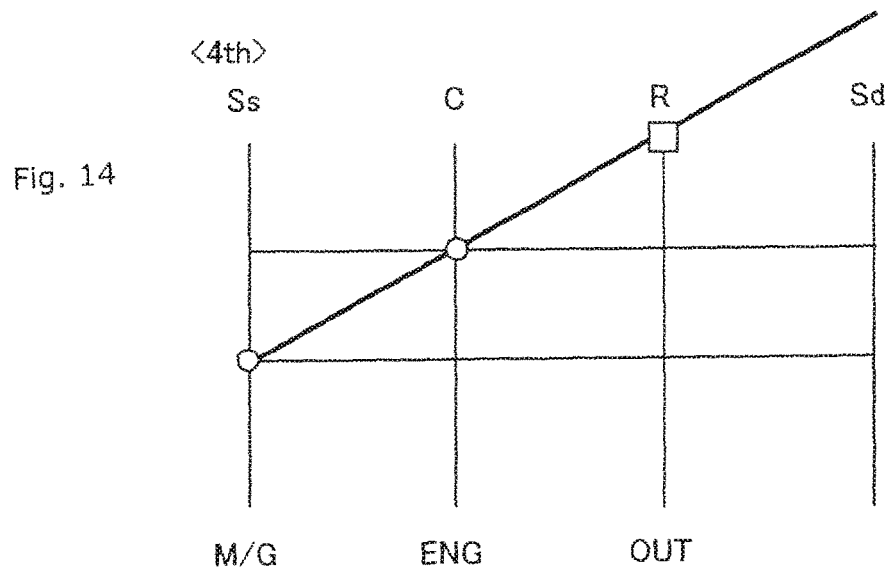
FIG. 14 is a common speed diagram showing a relation in speed of the four rotational elements in case of fourth speed (4th).

Due to inputting the speed of rotation to the carrier C from the engine and fixing the single pinion side sun gear Ss to the case, a common speed diagram as shown in FIG. 14 is obtained. Thus, from the ring gear R of the Ravigneaux planetary gear unit 4, there is obtained an over-drive speed change ratio in the fourth speed (4th) which is produced by increasing the speed of rotation led to the carrier C from the engine.

Accordingly, in case of making an up-shifting from the third speed (3rd) to the fourth speed (4th) during cruising of the vehicle, a clutch switching control effected between disengagement of the low & reverse clutch L&R/C and engagement of the high brake H/B makes the shifting to the fourth speed (4th) possible. Furthermore, by controlling the torque of the motor in addition to carrying out the clutch switching control, a smoothed speed change can be carried out generating no torque shortage in spite of using the dog-clutch type engaging/disengaging elements.

Furthermore, when, under cruising, it is intended to shift the speed from the stepless change speed (eCVT) to the fourth speed (4th), engagement of the high brake H/B is carried out. With this, shifting to the fourth speed (4th) is achieved.

(Reverse Stage)

A speed change operation for the reverse stage with be explained with reference to FIGS. 15 and 16.

In the reverse stage (Rev), by engaging the reverse brake Rev/B, the carrier C of the Ravigneaux planetary gear unit 4 is fixed to the transmission case 3. And, by engaging the low & reverse clutch L&R/C and the input clutch CL1 respectively, the engine 5 and the motor/generator 6 are connected to the single pinion side sun gear Ss of the Ravigneaux planetary gear unit 4. Upon this, the rotation drive force from the engine 5 is inputted to the single pinion side sun gear Ss through the input clutch CL1, the input shaft 1, the low & reverse clutch L&R/C and the connecting member 8. The drive force from the motor/generator 6 is inputted to the single pinion side sun gear Ss through the connecting gear 7 and the connecting member 8 (see arrows in FIG. 15).

Figure 16:
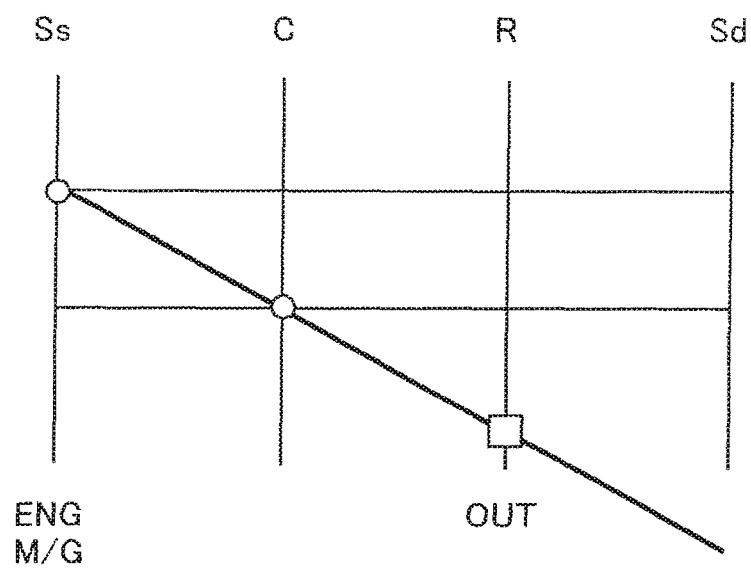
FIG. 16 is a common speed diagram showing a relation in speed of the four rotational elements in case of the reverse stage (Rev).

Due to inputting the speed of rotation (=motor input rotation speed) to the single pinion side sun gear Ss from the engine and fixing the carrier C to the case, a common speed diagram as shown in FIG. 16 is obtained. Thus, from the ring gear R of the Ravigneaux planetary gear unit 4, there is obtained a speed change ratio for the reverse stage (Rev) which is produced by reversing the rotation (=motor input rotation speed) led to the single pinion side sun gear Ss from the engine.

Accordingly, in the reverse stage (Rev), the vehicle can run backward with the aid of at least one of the engine and the motor/generator.

Furthermore, by engaging only the reverse brake Rev/B, an EV reverse mode can be established with the rotation drive force of the motor/generator 6. In case of selecting the EV reverse mode, there is no need of respectively engaging the low & reverse clutch L&R/C and the input clutch CL1 unlike in the case of an HEV reverse mode depicted by FIG. 15.

In the reverse stage of the HEV reverse mode, reverse running can be made by selecting either one of the assist reverse mode (motor powering), the engine reverse mode (no motor load) and the engine generation reverse mode (regeneration by generator). That is, by making a selection in the reverse modes, the engine load can be controlled.

[Operation Made in Each Claim]

As is described hereinabove, in the automatic transmission of the first embodiment, there are obtained stepped speed changes (e1st, 1st, 2nd, 3rd, 4th, Rev) and the stepless speed change (eCVT). In the following, operation made in each of Claims that define features of the automatic transmission of the first embodiment will be described.

In the first embodiment, by using the Ravigneaux planetary gear unit 4 with four rotational elements, the two clutches (L&R/C, H/C) and the one brake (L/B), there is established an arrangement providing the first speed (1st), second speed (2nd), third speed (3rd) and stepless speed change (eCVT).

When, with such arrangement, the stepless speed change (eCVT) is selected, engagement of the high clutch H/C brings about connection between the carrier C of the Ravigneaux planetary gear unit 4 and the engine 5. Accordingly, when the power generation amount of the motor/generator 6 constantly connected to the single pinion side sun gear Ss of the Ravigneaux planetary gear unit 4 is controlled, the motor/generator 6 becomes a variable load against the single pinion side sun gear Ss of the Ravigneaux planetary gear unit 4, and thus, the speed (=input rotation speed) of rotation led to the carrier C from the engine 5 is steplessly varied in accordance with the load restriction. That is, the speed change ratio, which is a ratio between an input rotation speed and an output rotation speed, can be steplessly or continuously varied. Furthermore, by varying the power generation amount (regenerative torque) produced by the motor/generator 6, the engine rotation speed and the engine load (=power generation load) can be controlled.

For example, when it is intended to keep the power generation load received by the engine 5 to a level lower than a given level, a torque control is carried out in which a target regenerative torque for keeping the engine power generation load to a level lower than the given level is set and the regenerative torque of the motor/generator 6 is harmonized with the target regenerative torque. Furthermore, in order to keep the rotation speed of the engine 5 at a so-called fuel saving speed, a rotation speed control is carried out in which a target motor rotation speed for keeping the engine speed at the fuel saving speed is set and the rotation speed of the motor/generator 6 is harmonized with the target motor rotation speed. In case where any engine operation points are aimed, the points are obtainable due to the freedom possessed by the stepless speed change realized by the power generation control for the motor/generator 6. That is, by controlling the load and rotation speed of the engine 5 by the motor/generator 6, the freedom of the engine operation point can be increased.

In the first embodiment, by adding the high brake H/B and establishing the engagement of the high clutch H/C and that of the high brake H/B, there is established an arrangement providing the fourth speed (4th) in which the rotation drive force from the engine 5 is operatively used.

When, with such arrangement, the fourth speed (4th) is selected in a high speed cruising, the rotation speed of the engine 5 is varied in a rotation speed range that assures a high engine efficiency. Accordingly, in the high speed cruising, without the aid of the motor/generator 6, the vehicle can be powered by only the engine 5 that operates in the rotation speed range assuring the high engine efficiency.

In the first embodiment, by adding the reverse brake Rev/B and establishing the engagement of the low & reverse clutch L&R/C and that of the reverse brake Rev/B, there is established an arrangement by which the reverse stage (Rev) can be provided. With such arrangement, the backward running of the vehicle is possible by only the rotation drive force of the engine 5 even when, due to shortage of the battery residual capacity, the cruising can't be effected by only the motor/generator 6.

In the first embodiment, the Ravigneaux planetary gear unit 4 is used as a planetary gear unit including four rotational elements, the input shaft 1 is arranged radially inside of the Ravigneaux planetary gear unit 4 and the high clutch H/C and the reverse brake Rev/B are arranged at one axial end of the Ravigneaux planetary gear unit 4. And the low brake L/B is arranged at the other axial end of the Ravigneaux planetary gear unit 4, and the low & reverse clutch L&R/C and the high brake H/B are arranged at the other axial end of the Ravigneaux planetary gear unit 4 and placed at positions farther away than the low brake L/B in a distance from the Ravigneaux planetary gear unit 4. And a layout is so made that the motor/generator 6 is placed between the low brake L/B and the high brake H/B.

With the above-mentioned layout, an axial length of the Ravigneaux planetary gear unit 4 is shortened as compared with a case in which two planetary gear units are used. Furthermore, since the plurality of engaging/disengaging elements are separated into two groups that are arranged at axially both ends of the Ravigneaux planetary gear unit 4, the axial length of the plurality of engaging/disengaging elements can be shortened. Furthermore, by placing the motor/generator 6 in a space between the plurality of engaging/disengaging elements, the motor/generator 6 can be set in the transmission case 3.

Accordingly, the automatic transmission can be compact in size with a shortened axial length.

In the first embodiment, for the high clutch H/C and reverse brake Rev/B, a pair of dog clutches are used which are able to selectively establish a synchronized engagement, and for the low & reverse clutch L&R/C and high brake H/B, a pair of dog clutches are used which are able to selectively establish a synchronized engagement.

That is, as is seen from FIG. 2, the high clutch H/C and reverse brake Rev/B are respective engaging/disengaging elements that have no chance to establish "engagement" at the same time in the same speed. Also the low & reverse clutch L&R/C and high brake H/B are respective engaging/disengaging elements that have no chance to establish "engagement" at the same time in the same speed as is seen from FIG. 2.

Accordingly, by arranging the engaging/disengaging elements, which have no chance to establish "engagement" at the same time, at positions adjacent to each other, the automatic transmission can be made more compact in size with the axial length reduced. In addition to this, due to sharing of the coupling sleeves 9 and 10 and a speed change actuator, the number of parts can be reduced.

In the first embodiment, the automatic transmission has both the EV start mode and the stepless change speed mode which are switchable. The first speed in the EV start mode (e1st) is a mode in which with engagement of the low brake L/B, the vehicle can run by only the drive force produced by the motor/generator 6. The stepless speed change in the stepless change speed mode (eCVT) is a mode in which with engagement of only the high clutch H/C, the speed change ratio can be steplessly varied while controlling the power generation amount of the motor/generator 6 and the vehicle can run by the drive force of the engine 5 while charging the battery. That is, in the EV start mode, the vehicle can run (viz., EV running) by only the power from the motor/generator 6. Furthermore, in the stepless speed change mode, it is possible to carry out the HEV running and battery charging by using the operation point that exhibits a high engine efficiency. Accordingly, it is possible to provide a fuel saving automatic transmission that exhibits reduction in fuel consumption.

In the following, effects will be described.

In the automatic transmission of the first embodiment, the following effects are obtained.

(1) An automatic transmission comprising: an input member (input shaft 1) connectable to an engine 5;

an output member (output gear 2);

a fixed portion (transmission case 3); and a planetary gear unit with four rotational elements (Ravigneaux planetary gear unit 4), in which:

the four rotational members of the planetary gear unit (Ravigneaux planetary gear unit 4) are a first element (single pinion side sun gear Ss), a second element (carrier C), a third element (ring gear R) and a fourth element (double pinion side sun gear Sd) which are arranged orderly on a common speed diagram;

the first element (single pinion side sun gear Ss) is constantly connected to a motor/generator 6 and connectable to the input member (input shaft 1) upon engagement of a first clutch (low & reverse clutch L&R/C);

the second element (carrier C) is connectable to the input member (input shaft 1) upon engagement of the second clutch (high clutch H/C);

the third element (ring gear R) is constantly connected to the output member (output gear 2);

the fourth element (double pinion side sun gear Sd) is fixable to the fixed portion (transmission case 3) upon engagement of the first brake (low brake L/B);

a first speed (1st) is established when engagement is effected in both the first clutch (low & reverse clutch L&R/C) and first brake (low brake L/B);

a second speed (2nd) whose speed change ratio is smaller than that of the first speed (1st) is established when engagement is effected in both the first brake (low brake L/B) and second clutch (high clutch H/C);

a third speed (3rd) whose speed change ratio is smaller than that of the second speed (2nd) is established when engagement is effected in both the first clutch (low & reverse clutch L&R/C) and second clutch (high clutch H/C); and a stepless speed change (eCVT) in which the speed change ratio is steplessly varied is established by engaging the second clutch (high clutch H/C) and varying the rotation speed of the motor/generator (FIG. 1).

Accordingly, by controlling the load and rotation speed of the engine 5, the degree of freedom of the engine operation point can be increased.

(2) The fourth speed (4th) whose speed change ratio is smaller than that of the third speed (3rd) is established by causing the first element (single pinion side sun gear Ss) to be connectable to the fixed portion (transmission case 3) due to engagement of the second brake (high brake H/B) and engaging both the second clutch (high clutch H/C) and second brake (high brake H/B) respectively (FIGS. 13 and 14).

Accordingly, in addition to the effect of (1), there is obtained another effect in which in a high speed cruising, the vehicle can move by only the drive force of the engine 5 that runs at a speed within a rotation speed range that exhibits a high engine effect, without usage of the drive force from the motor/generator 6.

Figure 15:
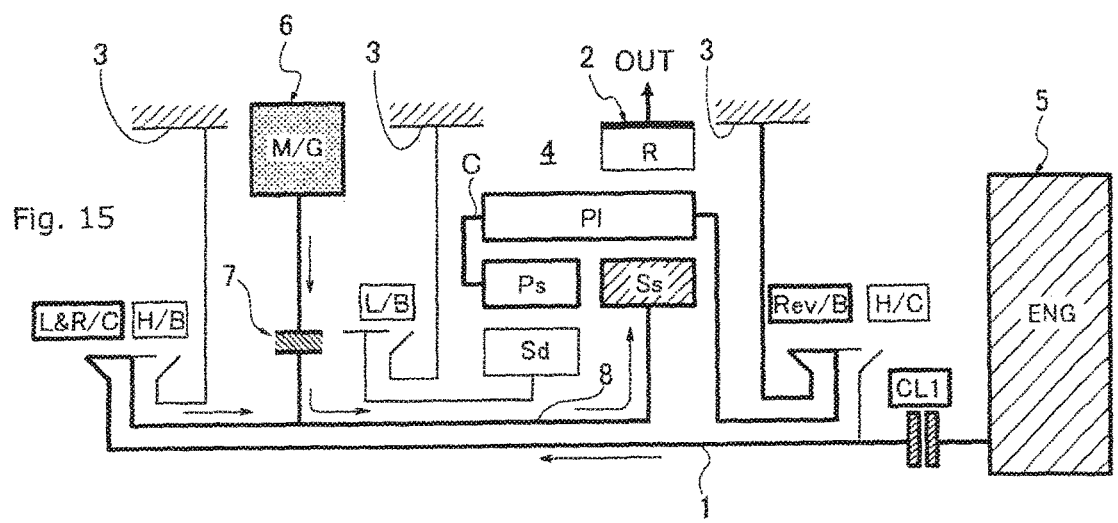
FIG. 15 is a skeleton view depicting a torque flow in case of a reverse stage (Rev).

(3) The reverse stage (Rev) is established by causing the second element (carrier C) to be fixable to the fixed portion (transmission case 3) due to engagement of the third brake (reverse brake Rev/B) and engaging both the first clutch (low & reverse clutch L&R/C) and third brake (reverse brake Rev/B) respectively (FIGS. 15 and 16).

Accordingly, in addition to the effects of (1) and (2), the vehicle can run backward by only the rotation drive force of the engine 5 even when, due to shortage of the battery residual capacity, the vehicle can't run by only the power from the motor/generator 6.

(4) An automatic transmission comprising:

an input member (input shaft 1) connectable to an engine 5;

an output member (output gear 2);

a fixed portion (transmission case 3); and a Ravigneaux planetary gear unit 4 including a first sun gear (single pinion side sun gear Ss), a second sun gear (double pinion side sun gear Sd), a first pinion gear (short pinion gear Ps) meshed with the second sun gear (double pinion side sun gear Sd), a second pinion gear (long pinion gear Pl) meshed with both the first pinion gear (short pinion gear Ps) and the first sun gear (single pinion side sun gear Ss), a carrier C rotatably carrying the first pinion gear (short pinion gear Ps) and the second pinion gear (long pinion gear Pl) and a ring gear R meshed with the second pinion gear (long pinion gear Pl), in which:

the first sun gear (single pinion side sun gear Ss) is constantly connected to the motor/generator 6, and connectable to the input member (input shaft 1) due to engagement of the first clutch (low & reverse clutch L&R/C) and fixable to the fixed portion (transmission case 3) due to engagement of the second brake (high brake H/B);

the carrier C is connectable to the input member (input shaft 1) due to engagement of the second clutch (high clutch H/C) and fixable to the fixed portion (transmission case 3) due to engagement of the third brake (reverse brake Rev/B);

the ring gear R is constantly meshed with the output member (output gear 2);

the second sun gear (double pinion side sun gear Sd) is fixable to the fixed portion (transmission case 3) due to engagement of the first brake (low brake L/B);

a first speed (1st) is established upon engagement of both the first clutch (low & reverse clutch L&R/C) and the first brake (low brake L/B);

a second speed (2nd) whose speed change ratio is smaller than that of the first speed (1st) is established upon engagement of both the first brake (low brake L/B) and the second clutch (high clutch H/C);

a third speed (3rd) whose speed change ratio is smaller than that of the second speed (2nd) is established upon engagement of both the first clutch (low & reverse clutch L&R/C) and the second clutch (high clutch H/C);

a fourth speed (4th) whose speed change ratio is smaller than that of the third speed (3rd) is established upon engagement of both the second clutch (high clutch H/C) and the second brake (high brake H/B);

a reverse stage (Rev) is established upon engagement of both the first clutch (low & reverse clutch L&R/C) and the third brake (reverse brake Rev/B); and a stepless change speed (eCVT) in which the speed change ratio is steplessly or continuously varied is established by engaging the second clutch (high clutch H/C) and varying the rotation speed of the motor/generator 6, further in which:

the input member (input shaft 1) is arranged in a radially inside of the Ravigneaux planetary gear unit 4;

the second clutch (high clutch H/C) and the third brake (reverse brake Rev/B) are arranged at one axial end of the Ravigneaux planetary gear unit 4;

the first brake (low brake L/B) is arranged at the other axial end of the Ravigneaux planetary gear unit 4;

the first clutch (low & reverse clutch L&R/C) and the second brake (high brake H/B) are arranged at the other axial end of the Ravigneaux planetary gear unit 4 and placed at positions farther away than the first brake (low brake L/B) in a distance from the Ravigneaux planetary gear unit 4; and the motor/generator 6 is constantly connected to the first sun gear (single pinion side sun gear Ss) through a way that extends in and along a space defined between the first brake (low brake L/B) and the second brake (high brake H/B) and a space defined between an inner circumference side of the second sun gear (double pinion side sun gear Sd) and an outer circumference side of the input member (FIG. 1).

Accordingly, in addition to the effects (1), (2) and (3), the automatic transmission can be made compact in size with its axial length reduced.

(5) The second clutch (high clutch H/C) and the third brake (reverse brake Rev/B) are a pair of dog-clutches that are constructed to selectively establish engagement of both the second clutch (high clutch H/C) and the third brake (reverse brake Rev/B); and the first clutch (low & reverse clutch L&R/C) and the second brake (high brake H/B) are a pair of dog-clutches that are constructed to selectively establish engagement of both the first clutch (low & reverse clutch L&R/C) and the second brake (high brake H/B) (FIG. 1).

Accordingly, since the engaging/disengagement elements that are suppressed from establishing engagement at the same time can be arranged adjacent to each other, the automatic transmission can be made more compact in size with its axial dimension reduced, and the number of parts can be reduced.

(6) The automatic transmission has an EV start mode and a stepless speed change mode which are switchable, in which the EV start mode is a mode in which with engagement of the first brake (low brake LB), the vehicle can run by only the drive force produced by the motor/generator 6, and the stepless speed change mode is a mode in which with engagement of only the second clutch (high clutch H/C), the speed change ratio can be steplessly varied while controlling the power generation amount of the motor/generator 6 and the vehicle can run by the drive force of the engine 5 while charging the battery (FIGS. 3, 4, 11 and 12).

Accordingly, in addition to the effects of (1) to (5), the automatic transmission can exhibit a fuel saving operation reducing a fuel consumption.

Although in the above the automatic transmission of the present invention has been described based on the first embodiment, the concrete construction is not limited to the above-mentioned one. That is, in the present invention, design change and part addition are allowed so long as the design change and the part addition don't extend beyond an inventive concept defined by the scope of Claims.

In the first embodiment, as a planetary gear unit having four rotational elements, there is used a Ravigneaux planetary gear unit in which a carrier for carrying both the single pinion planet and double pinion planet and a ring gear are connected. However, the planetary gear unit having four rotational elements is not limited to the Ravigneaux planetary gear unit. That is, the planetary gear unit may be of a type in which two sets of planetary gears are used and two rotational elements of either one of the two sets of planetary gears are connected to constitute four rotational elements.

In the first embodiment, an example is used in which the motor/generator 6 is connected to the connecting member 8 through the connecting gear 7. However, if desired, in the first embodiment, another example may be used in which for setting the motor/generator in the transmission, the rotor is fixed to the connecting member and the stator is fixed to the transmission case.

In the first embodiment, an example is used in which for the engaging/disengaging elements, the dog-clutch type is employed except the input clutch CL1. However, if desired, another example may be used in which for the engaging/disengaging elements, friction clutches and friction brakes are employed.

In the first embodiment, as the automatic transmission, an example is used by which a stepped speed change including four speeds forward with one reverse and a stepless speed change are achieved. However, if desired, as the automatic transmission, another example may be used by which a stepped speed change including three speeds forward with one reverse and a stepless speed change are achieved. In this example, the high brake H/B can be cancelled.

The invention claimed is:

1. An automatic transmission, comprising:
an input member connectable to an engine;
an output member;
a fixed portion; and
a planetary gear unit including four rotational elements,
wherein
the four rotational elements of the planetary gear unit are first, second, third and fourth elements which are arranged so as to be represented on a common speed diagram in the order of the first element, the second element, the third element and the fourth element;
the first element is constantly connected to a motor/generator and connectable to the input member due to engagement of a first clutch;
the second element is connectable to the input member due to engagement of a second clutch;
the third element is constantly connected to the output member;
the fourth element is fixable to the fixed portion due to engagement of a first brake;
a first speed is established due to engagement of both the first clutch and the first brake;
a second speed whose speed change ratio is smaller than that of the first speed is established due to engagement of both the first brake and the second clutch;
a third speed whose speed change ratio is smaller than that of the second speed is established due to engagement of both the first clutch and the second clutch; and
a stepless speed change that enables the speed change ratio to vary steplessly is established by engaging the second clutch and varying a rotation speed of the motor/generator,
in which a reverse stage is obtained by:
establishing engagement of a third brake to cause the second element to be connectable to the fixed portion; and
establishing engagement of both the first clutch and the third brake.

2. An automatic transmission, comprising:
an input member connectable to an engine;
an output member;
a fixed portion; and
a Ravigneaux planetary gear unit including a first sun gear, a second sun gear, a first pinion gear meshed with the second sun gear, a second pinion gear meshed with the first pinion gear and the first sun gear, a carrier rotatably supporting the first pinion gear and the second pinion gear and a ring gear meshed with the second pinion gear,
wherein
the first sun gear is constantly connected to a motor/generator and connectable to the input member due to engagement of a first clutch and fixable to the fixed portion due to engagement of a second brake,
the carrier is connectable to the input member due to engagement of a second clutch and fixable to the fixed portion due to engagement of a third brake,
the ring gear is constantly connected to the output member,
the second sun gear is fixable to the fixed portion due to engagement of a first brake,
a first speed is established due to engagement of both the first clutch and the first brake,
a second speed whose speed change ratio is smaller than that of the first speed is established due to engagement of the second clutch,
a third speed whose speed change ratio is smaller than that of the second speed is established due to engagement of both the first clutch and the second clutch,
a fourth speed whose speed change ratio is smaller than that of the third speed is established due to engagement of both the second clutch and the second brake,
a reverse stage is established due to engagement of both the first clutch and the third brake, and
a stepless speed change is established by engaging the second clutch and varying the rotation speed of the motor/generator, and
wherein
the input member is arranged in an inner circumference of the Ravigneaux planetary gear unit,
the second clutch and the third brake are arranged at one axial end side of the Ravigneaux planetary gear unit,
the first brake is arranged at the other axial end side of the Ravigneaux planetary gear unit,
the first clutch and the second brake are arranged at the other axial end side of the Ravigneaux planetary gear unit and placed at positions farther away than the first brake in distance from the Ravigneaux planetary gear unit, and
the motor/generator is constantly connected to the first sun gear through a way that extends in and along a space defined between the first brake and the second brake and a space defined between an inner circumference side of the second sun gear and an outer circumference side of the input member.

3. An automatic transmission as claimed in claim 2, in which:
the second clutch and the third brake are a pair of dog clutches structured to selectively establish engagement of the second clutch and the third brake; and
the first clutch and the second brake are a pair of dog clutches structured to selectively establish engagement of the first clutch and the second brake.

4. An automatic transmission as claimed in claim 2, in which:
the automatic transmission has an EV start mode and a stepless speed change mode which are switchable,
the EV start mode is a mode in which, with the first brake kept engaged, the vehicle is movable by only a drive force produced by the motor/generator, and
the stepless speed mode is a mode in which the speed change ratio is steplessly varied by engaging only the second clutch and controlling a power generation amount of the motor/generator and in which the vehicle is movable by the drive force of the engine while charging a battery.

* * * * *